G. M. FARNHAM.
PAPER CUTTING MACHINE.
APPLICATION FILED APR. 5, 1909.
933,540.
Patented Sept. 7, 1909.
2 SHEETS—SHEET 1.
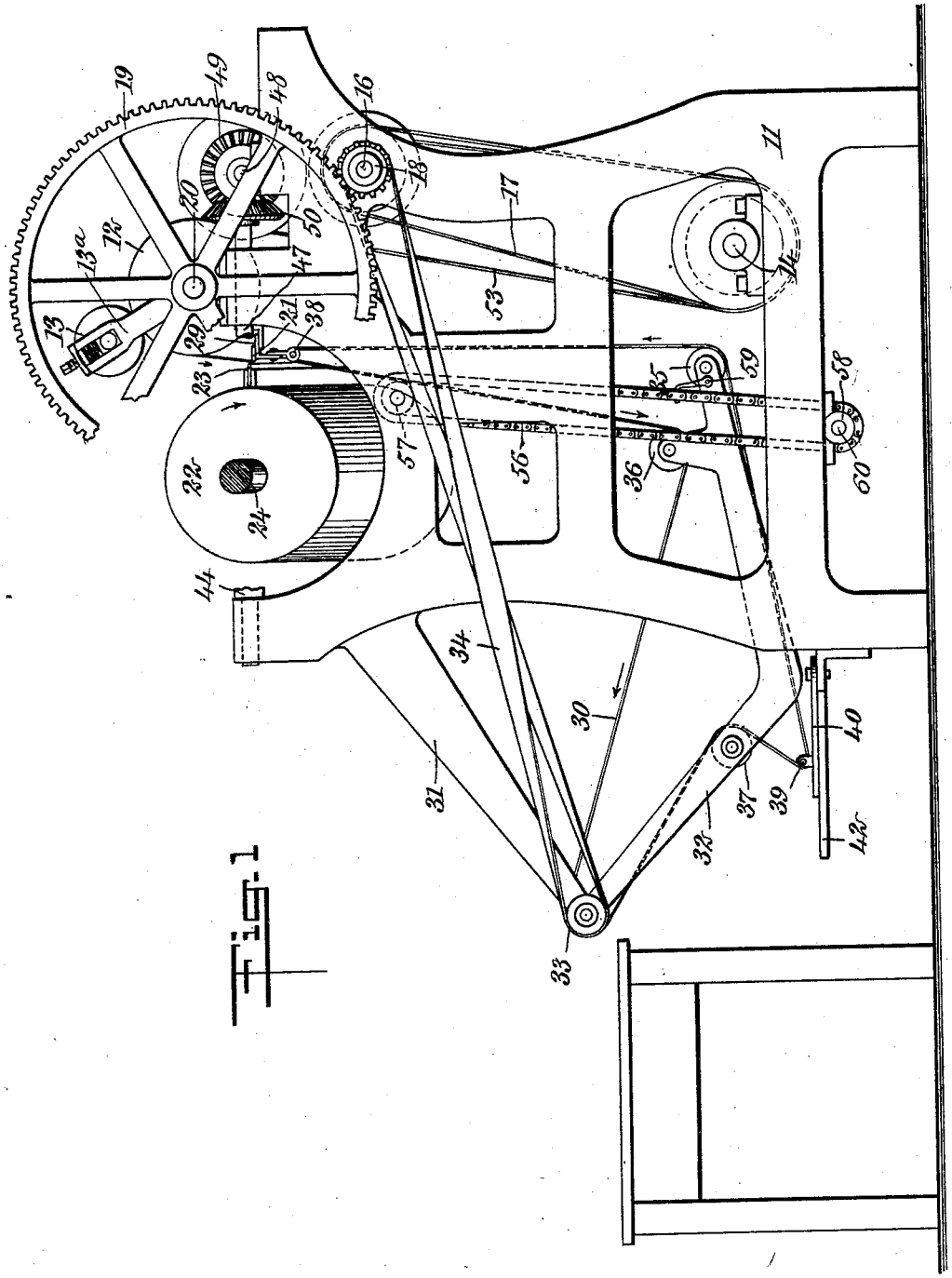
WITNESSES
F. D. Sweet.
C. W. Fairbank
INVENTOR
George M. Farnham
BY Munn & Co.
ATTORNEYS G. M. FARNHAM.
PAPER CUTTING MACHINE.
APPLICATION FILED APR. 5, 1909.
933,540.
Patented Sept. 7, 1909.
2 SHEETS—SHEET 2.
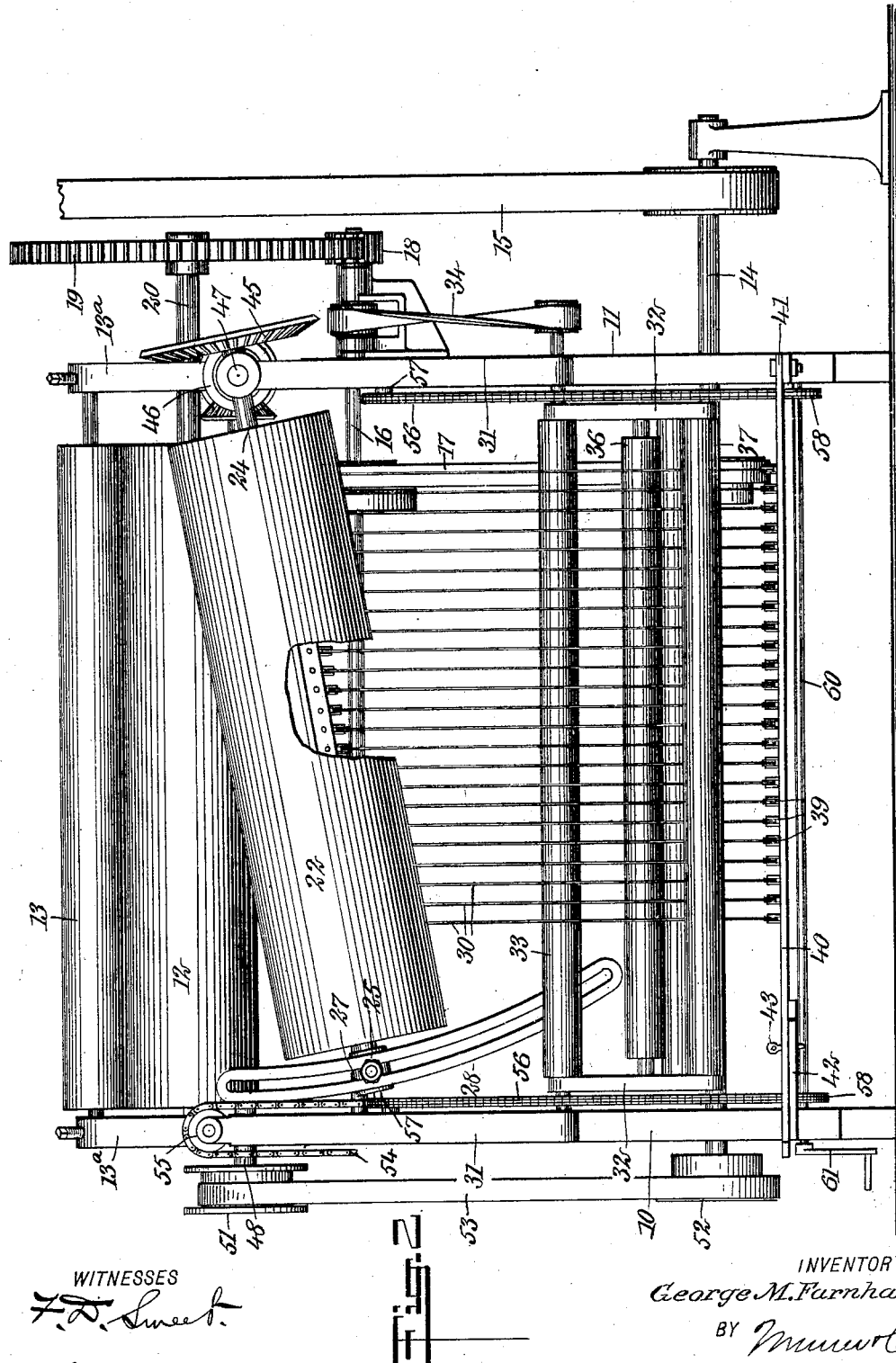
WITNESSES
F. D. Sweet
C. W. Fairbank
INVENTOR
George M. Farnham
BY Munn & Co
ATTORNEYS

UNITED STATES PATENT OFFICE.

GEORGE MADDOCKS FARNHAM, OF SOUTH BREWER, MAINE.

PAPER-CUTTING MACHINE.

933,540.  Specification of Letters Patent.  Patented Sept. 7, 1909.

Application filed April 5, 1909. Serial No. 487,926.

*To all whom it may concern:*

Be it known that I, GEORGE M. FARNHAM, a citizen of the United States, and a resident of South Brewer, in the county of Penobscot and State of Maine, have invented a new and Improved Paper-Cutting Machine, of which the following is a full, clear, and exact description.

This invention relates to certain improvements in machines for cutting paper into diagonal strips, and more particularly to that type of machine in which there is employed a cutter disposed at an angle to the roll of paper to be cut, and adjustable to vary the angle at will.

The object of the invention is to provide mechanism which will receive the strips of paper directly as they come from the cutter and convey them to a table or the like, said conveying means being capable of adjustment to correspond to the adjustment of the cutter.

Reference is to be had to the accompanying drawings, forming a part of this specification, in which similar characters of reference indicate corresponding parts in both the figures, and in which—

Figure 1 is a partial end view of a machine embodying my improved conveying and guiding mechanism; and Fig. 2 is a side view of the delivery end of the machine.

In the accompanying drawings, I have illustrated a portion of a machine to which a continuous strip of paper may be fed and which will serve to cut the paper into diagonal strips at any desired angle. As the main features of the machine itself do not involve my invention, I have merely illustrated sufficient portions of the machine to clearly disclose the construction and method of operation of my improved conveying and guiding mechanism.

In the machine illustrated, there are employed end frames 10 and 11, which serve to support, adjacent the upper ends thereof, two conveying rollers 12 and 13, between which the paper to be cut is fed. The rollers may be operated in any suitable manner, but, as illustrated, there is mounted a main shaft 14 adjacent the lower portion of the machine and receiving power through a belt 15. Above the main shaft 14 is an auxiliary shaft 16 to which power is transmitted by a belt 17 passing over suitable pulleys. Each pulley may be of cone form, if desired, so as to permit of a variation in the speed of the machine. Upon the auxiliary shaft 16 is a pinion 18 intermeshing with a gear 19 on the shaft 20 of the feed roller 12. The rollers 12 and 13 have their axes disposed substantially horizontally and from these rollers the paper is delivered downward substantially vertically. The supporting brackets 13ᵃ for the upper roller 13 may be provided with slots to receive the ends of the roller and suitable springs may be provided for holding the two rollers in resilient engagement with each other, as indicated particularly in Fig. 1.

The cutting mechanism includes two cutting members, one a knife 21 normally stationary, and the other a rotatable member 22 having a knife 23 adapted to coöperate with the knife 21. The two cutting members are mounted in a yoke which includes a transverse pivot 44 mounted at one end of the two cutting members and extending substantially at right angles to the axis of the shaft 24 of the rotary cutting member. Said shaft extends transversely through the yoke, and at its upper end is provided with a bevel gear wheel 45 intermeshing with a bevel gear wheel 46 carried by a shaft 47 extending into one end of the yoke. As the shaft 47 is concentric with the end of the yoke, and this yoke constitutes a pivot for the bodily movement of the rotary cutter, it is evident that the engagement of the gears 45 and 46 will be unaffected by any adjustment of the cutters. The shaft 47 may be driven from the main drive shaft 14 in any suitable manner, for instance, through the medium of a shaft 48 having a bevel gear 49 intermeshing with a bevel gear 50 on the shaft 47, and having a pulley 51 opposite to the pulley 52 on the shaft 14. A belt 53 extends over these two pulleys to drive the shaft 48 from the shaft 14. The yoke at the lower end, includes a transverse member 27 in which the lower end of the shaft 24 is journaled, and to which is rigidly secured the lower end of the knife 21. This transverse member is movable in a curved guide 28, the center of curvature of which is the upper or pivot member of the yoke. The yoke is provided with means, for instance, a nut 25, for rigidly securing it to the guide at any position along the length of the latter. As the yoke member 27 is raised or lowered, it is evident that the adjacent ends of both of the cutting members will be raised or lowered simultaneously, and the relative adjustment of the two cutting members will not be affected. For raising and lowering the lower end of the two cutters, a suitable chain 54 may be provided and having one end thereof connected to the lower yoke. The chain intermediate its ends, may pass over a pulley or sprocket wheel 55 mounted on the frame of the machine.

One of the essential features of my invention resides in the conveying mechanism for receiving the strips of paper as they come from the cutter and delivering them to a table or other receiver. This conveying mechanism includes a plurality of tapes, straps, cords, or bands 30, so mounted that they receive the diagonal strips directly from the cutters and convey them to the table or the like, irrespective of the inclination of the cutters.

The main frame is provided with outwardly-extending arms 31, to the outer ends of which are pivotally secured arms 32, extending back between the two end frames of the machine to a point substantially in the vertical plane of the two cutters. These arms 32 have mounted adjacent their outer ends, a roller 33 having its axis coincident with the pivotal support of the arms 32 and adapted to be driven by a belt 34 extending from a pulley on the auxiliary shaft 16 to a pulley on the shaft of the roller 33. The arms 32 adjacent their innermost ends, carry a roller 35 below the cutters and a third roller 36 upon a slightly higher elevation than the roller 35, and adjacent the outer portion the arms support a fourth roller 37. A large number of separate straps, bands or cords 30 are employed, and each one of them extends not only in engagement with the four rollers 33, 35, 36 and 37, but each passes over its own individual pulley 38, depending from the under side of the blade support 29, and over its own individual pulley 39, supported upon a movable bar 40. The pulleys 38 come closely adjacent to the cutters, and the paper in leaving the cutters passes directly onto the bands therebetween. The bands extend from the pulleys 38 downward beneath the roller 36, and outward, for instance substantially horizontally to the roller 33, where they deliver the strips onto the table or other support. The bands extend back under the roller 33, over the roller 37, under the pulleys 39, back beneath the roller 35, and upwardly to the pulleys 38. The bar 40 which supports the pulleys 39, is mounted upon a pivot 41 at one end, and in substantially the same vertical plane as the pivotal support of the two cutters. The bar 40 is movable in a horizontal plane, and its opposite end is adapted to be secured to an outwardly-extending supporting arm 42 in any suitable manner, as, for instance, by a pin 43.

The bands receive the strips directly from the cutters and deliver them to the table, as above indicated, and all of the bands are kept at substantially the same tension. When the cutters are adjusted by raising or lowering one end thereof to vary the angle of the cut, the bar 40 is moved through a corresponding angle. As the roller 33 and the rollers 35 and 36 are unaffected by the angular adjustment of the cutters, it is evident that the delivery to the table will be uniform at all angles. In order that the lower ends of the strips may pass between the rollers 36 and the bands before the strips are cut, the innermost ends of the arms 32 are raised or lowered according as the strips cut are short or long. This permits the lower end of the paper to be brought between the band and the roller 36 before the strips are cut, and is a very important feature of my construction. The specific mechanism for accomplishing this raising and lowering preferably includes two chains 56, 56, each passing over two corresponding sprocket wheels 57 and 58 mounted substantially one above the other. The innermost ends of the arms 32 are each provided with a hook 59, which has engagement with the adjacent chain, and means are provided for moving the two chains simultaneously to raise or lower the two arms 32. The two lower sprocket wheels 58, 58 are preferably mounted on the same shaft 60, which latter has a crank 61 at one end thereof. Any suitable means may be provided for normally locking the shaft 60 against rotation.

Having thus described my invention, I claim as new and desire to secure by Letters Patent:

1. In combination, a cutter including a frame pivoted adjacent one end thereof, a normally stationary blade and a movable blade both carried thereby and adapted to coöperate, a plurality of pulleys carried adjacent said normally stationary blade, and a plurality of endless conveyers extending over said pulleys and adapted to receive the material from said blades.

2. In combination, a cutter including a frame pivoted adjacent one end thereof, a normally stationary blade and a movable blade both carried thereby and adapted to coöperate, a plurality of pulleys carried adjacent said normally stationary blade, a plurality of endless conveyers extending over said pulleys and adapted to receive the material from said blades, and a pivoted member for maintaining all of said conveyers under substantially the same tension irrespective of the angular adjustment of said frame and its blades.

3. In combination, a cutter including a blade having one end thereof pivoted and the opposite end movable about said pivot, a plurality of pulleys carried by said blade, and a plurality of endless conveyers extending over said pulleys.

4. In combination, a plurality of substantially parallel endless conveyers, a cutter including a blade movable about a pivot to vary the angle of cut, and a plurality of pulleys for said conveyers and movable with said blade.

5. In combination, a plurality of endless conveyers, a cutter, a transverse support having a plurality of pulleys to receive said conveyers and movable in the arc of a circle, to maintain a predetermined relationship to said cutter, and a second support having a plurality of pulleys also movable in the arc of a circle to maintain said conveyers at the desired tension.

6. In combination, a cutter including a rotary member and a normally stationary cutter blade, said member and blade each having one end thereof movable about the opposite end as a pivot, a plurality of pulleys carried by said blade, a plurality of endless conveyers extending over said pulleys, and a transverse member pivoted at one end and also having a plurality of pulleys for said conveyers.

7. In combination, a cutter including a normally stationary cutter blade having one end thereof pivoted and the opposite end thereof movable about said pivot to vary the angle of cut, a plurality of pulleys carried by said blade, and a plurality of conveyers extending over said pulleys.

In testimony whereof I have signed my name to this specification in the presence of two subscribing witnesses.

GEORGE MADDOCKS FARNHAM.

Witnesses:
AMBROSE F. PENDLETON,
JOHN L. JENKINS.